F. Wingate,
Water Wheel,
9,478 X
Patented Mar. 4, 1836.
S S
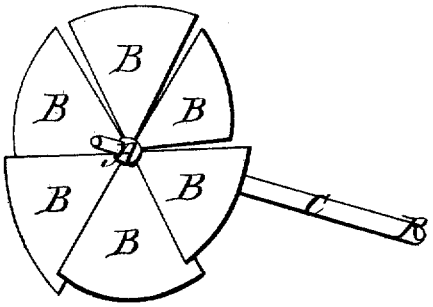
T T
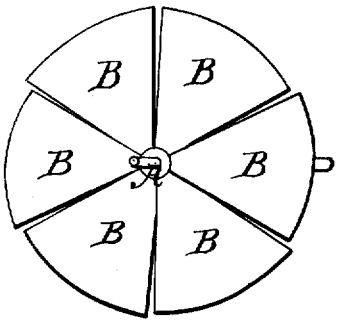
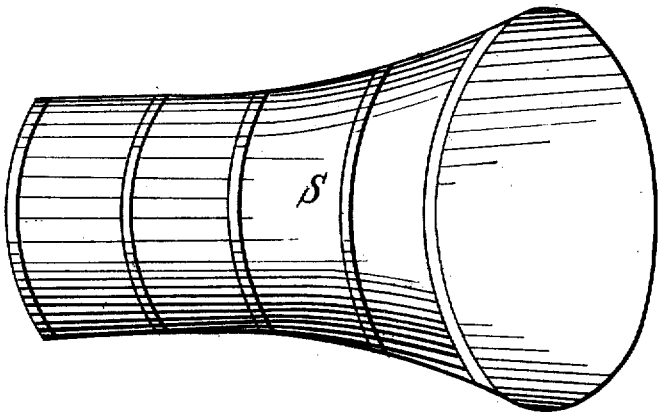
R. PETERS, PHOTO-LITHOGRAPHER, WASHINGTON. D. C.

Mar. 4. 1836 9478X

Frederic Wingate, of Augusta; Maine -
Letters Patent

The schedule referred to, in these Letters Patent, and making part of the same, containing a description in the words of the said Frederic Wingate himself, of his improvement in the water wheel.

---

To all to whom these presents shall come; Be it known that I. Frederic Wingate of Augusta, in the County of Kennebec & State of Maine, have invented a water wheel on the principle of Hydraulic pressure, and also on the principle of propelling mills, machinery of any kind, boats and vessels by water power - What I claim as my own invention and not previously known is the form of the wheel and its adaptation to the propelling of all sorts of machinery, mills, boats & vessels, cars in a tunnel in currents, in tide waters, in canals, and in streams of comparatively small size. The hub A. of the wheel may be made of wrought iron, cast iron, or even of wood, secured by iron rings or bands, and of such size, as the size of the wheel shall render necessary -
The dovetail - shaped paddles B. (to consist of six or more to each wheel) are to be secured into the hub at their small end so as that they shall first shut past each other and stand diagonally across the hub or they may be secured into the shaft and be placed along the whole or a part of its length & leave a sufficient passage for the water to run between them. The wheel is to run vertically upon a horizontal shaft C, the shaft to be upheld by posts from the bottom, or by timbers hanging from a frame constructed above, or by both as circumstances may require. The wheel thus constructed may be placed in a tunnel S or conducting passage which may be made of iron, wood or stone which shall lead the water to it, and the tunnel, or conducting passage may have each end large where the wheel is to be used in tide waters, so as to direct the water to the wheel each way, or the wheel may be used without the tunnel or conducting passage. The plate SS presents an oblique view of the wheel on the shaft ready to be put up. The plate T.T. represents a front view of the wheel & shaft. The plate S gives a view of the tunnel made single, and when used in tide waters another similar tunnel is to be added to it in a reversed position, &

9478X as to receive the water each way. The power may be communicated to the
machinery &c. to be propelled by a cog wheel fixed to the shaft at R. to
mash into another cog wheel placed horizontally, or by a band or chain
to run around a drum or barrel wheel to be fixed to the shaft at R.
My wish is to have the patent granted, so as to secure to me the use of the
principle of the invention to any purpose for which the wheel may be ad-
vantageously applied. The Patent I wish called Wingates improved water
wheel. Augusta (Me) January 1st 1836 —

Witnesses
James L. Child
Russell Eaton

Frederic Wingate

Drawing

[585 words]

[illegible]
[illegible]